United States Patent [19]

Hulme-Lowe et al.

[11] Patent Number: 4,968,116
[45] Date of Patent: Nov. 6, 1990

[54] POLYMER CLADDINGS FOR OPTICAL FIBRE WAVEGUIDES

[75] Inventors: Alan G. Hulme-Lowe, Bishop's Stortford; Alistair S. Dodds, Harlow, both of England; Stefan A. Babirad, Minneapolis; Patricia M. Savu, Maplewood, both of Minn.

[73] Assignee: Minnesota Mining and Manufacturing Company, St. Paul, Minn.

[21] Appl. No.: 463,873

[22] Filed: Jan. 5, 1990

Related U.S. Application Data

[63] Continuation of Ser. No. 322,893, Mar. 13, 1989, abandoned.

[30] Foreign Application Priority Data

Mar. 15, 1988 [GB] United Kingdom ............... 8806137
Oct. 31, 1988 [GB] United Kingdom ............... 8825400

[51] Int. Cl.$^5$ ............... G02B 6/00; B05D 5/06
[52] U.S. Cl. ............... 350/96.3 A; 350/96.30; 350/96.29; 427/54.1; 427/163
[58] Field of Search ............... 350/96.29, 96.30, 96.34, 350/96.23; 427/44, 54.1, 162, 163

[56] References Cited

U.S. PATENT DOCUMENTS

| | | | |
|---|---|---|---|
| 4,099,837 | 7/1978 | Vazirani | 350/96.29 |
| 4,125,644 | 11/1978 | Ketley et al. | 427/36 |
| 4,511,209 | 4/1985 | Skutnik | 350/96.34 |
| 4,707,076 | 11/1987 | Skutnik et al. | 350/96.34 |

FOREIGN PATENT DOCUMENTS

| | | | |
|---|---|---|---|
| 0250996 | 1/1988 | European Pat. Off. | 350/96.34 X |
| 0256765 | 2/1988 | European Pat. Off. | 350/96.34 X |
| 0257863 | 2/1988 | European Pat. Off. | 350/96.34 X |
| 1262526 | 2/1972 | United Kingdom | 427/162 X |

Primary Examiner—Brian Healy
Attorney, Agent, or Firm—Donald M. Sell; Walter N. Kirn; Lorraine R. Sherman

[57] ABSTRACT

An optical fibre comprising a core coated with a cladding composition having a lower refractive index than the core, said cladding composition comprising a fluorinated mono-acrylate, a polyfunctional cross-linking acrylate being difunctional or higher, and a photoinitiator, said cladding composition comprising less than 0.3% by weight of a mono- or polyfunctional thiol and being cured or cross-linked.

41 Claims, 1 Drawing Sheet

POLYMER CLADDINGS FOR OPTICAL FIBRE WAVEGUIDES

This is a continuation application Ser. No. 07/322,893 filed Mar. 13, 1989 now abandoned.

FIELD OF THE INVENTION

This invention relates to optical fibres and in particular to optical fibres comprising a glass core coated with a polymer cladding.

BACKGROUND TO THE INVENTION

The use of optical fibres as a means of transmitting data has received widespread interest. Information transfer using a modulated light beam guided by a glass or plastics fibre has been utilized in many applications including telecommunications and computer link-up and data base use. Advantages of the use of fibre optic linkages are very high information carrying capacity compared to metal wires carrying electrical signals and freedom from external interference.

Optical fibres comprise a core, generally an inorganic glass such as fused silica or a synthetic resin, and a cladding of a material having a lower refractive index than the core, which cladding confines the light energy to propagate in the core by total internal reflection. The refractive index of fused silica is 1.458 at room temperature and there is a limited range of materials which have refractive indices below this value. The efficiency of propagation increases as the difference in refractive index between the core and the cladding should be at least 0.03 units less than that of the core, preferably at least 0.05 units less.

Prior art cladding materials include thermoplastic polymers which are coated on the optical fibre by melt extrusion through a dye. This method of cladding suffers from the disadvantages that it is difficult to obtain thin coatings and the coatings tend to be loosely bonded to the silica core. Other polymers have been applied by solvent coating. However, solvent coating has the disadvantages that it may be necessary to coat a fibre several times until the desired thickness is obtained and the necessity of handling high solids solutions with attendant problems of bubbling of the coating. Furthermore, there is the additional problem of pollution of the environment during evaporation of the solvent.

Cross-linkable polymeric coating compositions have been employed which are rapidly cured after coating by heating or exposure to ultra violet light. Examples of such compositions are disclosed in U.S. Pat. Nos. 4,099,837, 4,125,644 and 4,511,209.

British Patent No. 1262526 discloses an optical element e.g. a lens, view aperture etc. comprising a solid transparent base e.g. a thermoplastics material, on which is coated a fluorine-containing transparent, thermoset organic polymer having an index of refraction within 0.02 units of the base. The polymer is formed from a fluorine-free acrylic monomer and a fluorine-containing acrylic monomer, at least one of which monomers being polyfunctional. The specific coating compositions disclosed utilise at least 70% by weight of the fluorine free acrylic monomer.

U.S. Pat. No. 4,511,209 discloses a cladding composition for plastic clad silica optical fibres comprising:

a highly fluorinated monofunctional acrylate with a refractive index below 1.38 and constituting more than 50% by weight of the composition, a polyfunctional acrylate being trifunctional or higher serving as a cross-linking agent, a mono- or polyfunctional thiol that functions as a synergist preferably a thiol containing silane e.g. gamma-mercaptopropyl trimethoxy silane, and a photoinitiator.

The cladding compositions are dip or spray coated onto the fibre and exposed to ultra violet radiation to cure the coating. The hard clad optical fibres produced have attenuation often below 10 dB/km and exhibit superior temperature behavior than silicone clad optical fibres.

The present invention provides alternative cladding formulations for optical fibres.

BRIEF SUMMARY OF THE INVENTION

Therefore, according to the present invention there is provided an optical fibre comprising a core coated with a cladding having a lower refractive index than the core, the cladding composition comprising a fluorinated mono-acrylate, a polyfunctional cross-linking acrylate being difunctional or higher, and a photoinitiator, the composition comprising less than 0.3% by weight of a mono- or polyfunctional thiol and being cored or cross-linked.

Also according to the invention there is provided a cladding composition for optical fibres comprising from 40 to 95% by weight of a fluorinated acrylate, from 2 to 35% by weight of a plolyfunctional cross-linking acrylate being difunctional or higher and from 0.5 to 20% by weight of a photoinitiator, the composition comprising less than 0.3% by weight of a mono- or polyfunctional thiol.

The cladding composition of the invention may readily be applied by dip coating and can be immediately photopolymerised to cause curing or cross-linking, by exposure to ultra violet light to provide optical fibres having equivalent and often superior properties to those of the prior art. In particular the adhesion to glass of the cladding composition of the invention is superior to that of the composition of U.S. Pat. No. 4,511,209. If the formulations of the invention additionally comprise other vinyl functionalized components e.g. (meth)acrylic silanes and (meth)acrylic acid the adhesion to glass is further increased.

The cladding compositions of the invention differ from the compositions of U.S. Pat. No. 4,511,209 in that they do not require the presence of a thiol synergist. The function of the synergist is not defined although suitable compounds are identified as being of the gamma-mercaptopropyl trimethoxy silane type. The most likely function of these compounds is to chain transfer the polymer chain to the mercapto function and then via the silane, bond the polymer to the core surface. This results in the polymer matrix having silane groups appended only at the termini of the polymer chains. In the composition of the present invention when adhesion enhancers, e.g. acrylic silanes, are employed it results in the incorporation of the adhesion enhancer through the matrix thereby significantly promoting adhesion.

DESCRIPTION OF PREFERRED EMBODIMENTS

Figure 1:
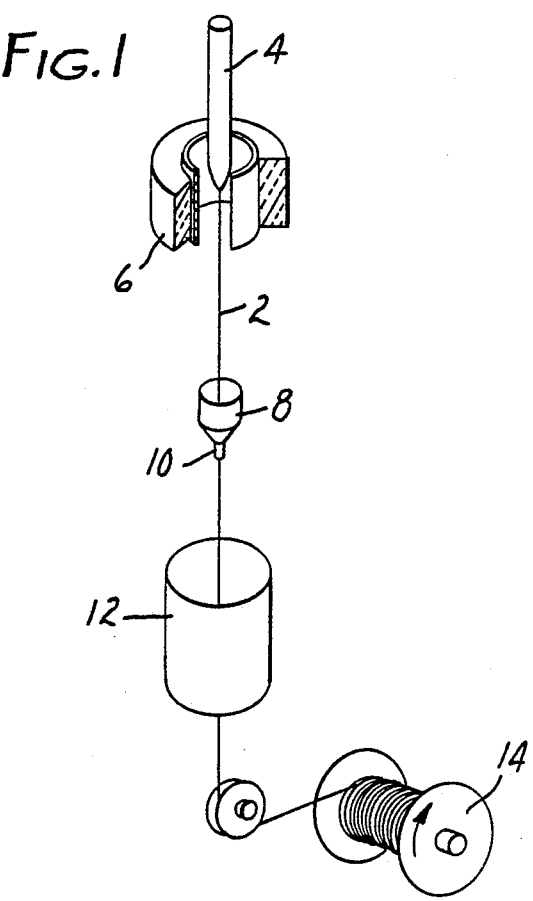

The fluorinated mono-acrylates used in the compositions of the invention possess one polymerisable vinyl group. The term acrylate is used in the generic sense and includes not only derivatives or acrylic acid, but also methacrylic and other modified acrylic acids.

The fluorinated mono-acrylates possess a fluoro aliphatic group in which the higher of a minimum of three C—F bonds are present or 25% of the C—H bonds have been replaced by C—F bonds.

The fluoroaliphatic radical is generally a fluorinated, preferably saturated, monovalent, non-aromatic, aliphatic radical of at least two carbon atoms. The chain may be straight, branched, or, if sufficiently large, cyclic, and may be interrupted by oxygen atoms or nitrogen atoms bonded only to carbon atoms. A fully fluorinated group is preferred, but hydrogen or chlorine atoms may be present as substituents in the fluorinated aliphatic radical; generally not more than one atom of either is present in the radical for every two carbon atoms. Preferably the radical contains a terminal perfluoromethyl group. Preferably, the fluorinated aliphatic radical contains not more than 20 carbon atoms. More preferably the fluorinated aliphatic radical is cycloaliphatic, such as perfluorohexyl or perfluoropentyl. The presence of a fluorinated cycloaliphatic radical provides the unobvious advantage of a tougher cured coating composition in which thermal oxidative degradation processes are retarded compared to acyclic compositions. It is then possible to extend the use of the cladded fibre to a broader temperature operating range without sacrificing the optical clarity and colourlessness of the coating.

Typical fluorinated mono-acrylates used in the invention are of the general formula:

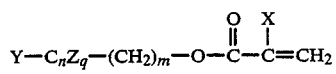

in which:
Y represents H, F or Cl;
Z represents H, F or Cl;
X represents H or an alkyl group, preferably $CH_3$,
n is an integer from 2 to 12,
q is an integer from 4 to 24,
m is 0, 1 or 2,
with the proviso that for Z not more than one atom of hydrogen or chlorine is present for every two carbon atoms in the group $C_nZ_q$.

Specific examples of such compounds include:
1,1-dihydroperfluorocyclohexane carbinol acrylate,
1,1-dihydroperfluorocyclohexane carbinol methacrylate,
1,1-dihydroperfluorocyclopentane carbinol acrylate,
1,1-dihydroperfluorocyclopentane carbinol methacrylate,
1,1-dihydroperfluoro-octyl acrylate,
1,1-dihydroperfluoro-octyl methacrylate,
1,1-dihydroperfluoro-butyl acrylate,
1H,1H,5H-octafluoro-pentyl acrylate,
1H,1H,11H-eicosafluoro-undecyl acrylate,
Hexafluoro-isopropyl acrylate,
Perfluoropentyl acrylate.

The acrylates may also possess other atoms e.g. sulphur and nitrogen, outside the fluoroaliphatic radical.

For example, fluorinated monoacrylates of the following general formula may be employed:

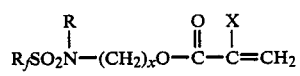

in which:
X is as defined above, $R_f$ represent a fluoro aliphatic radical, preferably $C_yF_{2y+1}$ in which y is an integer from 3 to 12,
R represents an alkyl group, generally of 1 to 5 carbon atoms, and
x is 1 or 2.

Specific examples of such compounds include:
2-(N-ethyl perfluoro octane sulphonamido)ethyl acrylate,
2-(N-ethyl perfluoro octane sulphonamido)ethyl methacrylate,
2-(N-butyl perfluoro octane sulphonamido)ethyl acrylate.

Mixtures of two or more fluorinated mono-acrylates may also be employed.

The poly-functional cross-linking acrylates used in the invention are at least difunctional, preferably trifunctional or higher. The compounds generally have a molecular weight of less than 600.

Typical tri- and tetrafunctional acrylates have the general formula:

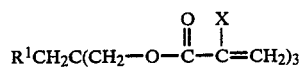

in which:
X is as defined above, and
$R^1$ represents an alkyl group, generally of 1 to 5 carbon atoms (e.g. methyl), hydroxy, or —O.-COC(X)$CH_2$ in which X is as defined above.

Suitable difunctional acrylates are of the general formula:

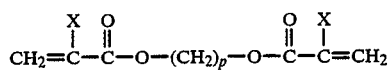

in which:
each X is as defined above and
p is an integer from 3 to 8.

Examples of cross-linking acrylates include:
Trimethylol propane tri(meth)acrylate,
1,4 butanediol di(meth)acrylate,
1,3 butanediol di(meth)acrylate,
1,6 hexanediol di(meth)acrylate,
Pentaerythritol tetra(meth)acrylate,
Pentaerythritol tri(meth)acrylate,
Dipentaerythritol penta(meth)acrylate, and
Hydantoin hexa acrylate.

Mixtures of cross-linking acrylates may be employed.

The photoinitiator may comprise any of the photoinitiators known in the art e.g. d-hydroxyacetophenone type photoinitiators. Examples of photoinitiators are those commercially available from Ciba Geigy under the Trade Marks IRGACURE 651, IRGACURE 500, IRGACURE 184, and those commercially available from Merck under the trade names DAROCUR 1173 (2-hydroxy 2-methyl 1-phenyl-1-propanone) and DAROCUR 1116 (2-hydroxy-2-methyl-1-(4-isopropylpheny)-1 propanone).

In general suitable cladding compositions will have the following formulation:

| | |
|---|---|
| fluorinated mono-acrylate | 50 to 95% by weight |
| cross-linking acrylate | 2 to 35% by weight |
| photoinitiator | 0.5 to 20% by weight. |

Preferably the components are selected within the following ranges:

| | |
|---|---|
| fluorinated mono-acrylate | 75 to 95% by weight |
| cross-linking acrylate | 2 to 10% by weight |
| photoinitiator | 0.5 to 10% by weight. |

In addition to the three components the compositions preferably include an adhesion enhancer e.g. a compound having a vinyl functionality and being different from the fluorinated mono-acrylate and the cross-linking acrylate. The adhesion enhancers possess a single polymerisable vinyl group, and may be methacrylate, preferably acrylate silanes such as 3-tri(m)ethoxy-silyl-propyl(meth)acrylate. Alternatively acrylic or methacrylic acid may be used as an adhesion enhancer.

The adhesion enhancers generally increase the bonding strength of the cladding composition to the silica by at least 10%, generally at least 20% compared with cladding compositions in which the adhesion enhancers are absent. Generally, the adhesion improves as the concentration of adhesion enhancer is increased. However, the refractive index of the cladding material also rises as the proportion of non-fluorinated material is increased, which is undesirable. Thus a compromise must be made, and best results have been obtained with the adhesion enhancer present in the range 1 to 25%, preferably 2 to 15% by weight of the composition.

The cladding compositions may also comprise a thermal stabilizer/antioxidant. Low loss optical fibres must pass a stringent cold/hot temperature cycling test. The optical fibres are kept at −65° C. for four hours and monitored as a function of loss in dB/Km. The fibres are then brought back to room temperature for two hours and thereafter held at +125° C. for four hours. Again the temperature is brought to ambient for two hours and the loss of the optical fibre is recorded. It has been found that the presence of up to 5%, generally 0.001% to 5%, preferably 0.01 to 1% by weight of one or more thermal stabilizers/antioxidants compatible with the cladding composition provides improved stability to the cold/hot cycling test. Suitable stabilizers/antioxidants include low melting hindered phenols and thioesters. Specific examples include 2, 6-di-tert-butyl-4-methyl phenol commercially available under the trade name Ultranox 226, octadecyl—3,5-di-tert-butyl-4-hydroxyhydrocinnamate commercially available under the trade name IRGANOX 1076, 2,6-di-tert-butyl-4-sec-butyl phenol commercially available under the trade names ISONOX 132 or VANOX 1320, and dilauryl thiodipropionate commercially available under the trade name CYANOX LTDP. A combination of thioester and hindered phenol has proved to be particularly effective.

The core of the optical fibres of the invention is preferably formed of an inorganic glass, more preferably fused silica, but may optionally be formed of a synthetic resin. The cladding composition is selected to provide a refractive index lower than that of the core, preferably at least 0.03 units less, more preferably at least 0.05 units less than the refractive index of the core.

The optical fibres of the present invention may be prepared by conventional techniques employing the cladding compositions of the invention.

The optical fibres of the invention may also possess a protective layer such as those known in the art. For example a protective coating of a fluoropolymer e.g. poly (tetrafluoroethylene), may be coated as an extrusion by passing the clad fibre through a melt of the fluoropolymer. A suitable fluoropolymer is commercially available from Dupont under the trade name Tefzel 210.

The accompanying drawing illustrates suitable apparatus for preparing a coated optical fibre in accordance with the invention.

A glass fibre 2 is drawn from a pure glass preform 4 held in a furnace 6 on a standard glass drawing tower. The tower is provided with a coating station comprising a coating cup 8 containing the cladding composition and the metering die 10. The coated fibre is passed immediately through an ultra violet curing station where it is photopolymerised and cooled on a take-up spool 14. A typical fibre will have an overall diameter of 200 microns and a cladding thickness of 10 microns.

The invention will now be illustrated by the following Examples.

In the Examples the following components were employed:

Mono-acrylate A: 2-(N-ethyl perfluoro-octane sulphonamido)ethyl acrylate commercially available from Minnesota Mining and Manufacturing Co., purified by extraction with ethanol.

Mono-acrylate B: 1,1-dihydroperfluoro-octylacrylate (commercially available from Minnesota Mining & Manufacturing Co.)

TMPTMA: trimethylolpropane trimethacrylate

HHA: hydantoin hexa-acrylate (commercially available from Minnesota Mining & Manufacturing Co.)

HDDA: hexanediol diacrylate acrylate silane: 3-trimethoxysilylpropyl methacrylate IG651: Irgacure 651 commercially available from Ciba Geigy (benzildimethylketal)

IG500: Irgacure 500 commercially available from Ciba Geigy

IG184: Irgacure 184 commercially available from Ciba Geigy thiol synergist: gamma-mercaptopropyl trimethoxysilane

EXAMPLE 1

A cladding composition was prepared by mixing the following components:

| | |
|---|---|
| Mono-acrylate A | 92 parts by weight |
| TMPTMA | 4 parts by weight |
| IG651 | 4 parts by weight |

Coated fibres were prepared by the technique described with reference to FIG. 1 to produce coated fused silica optical fibres having an overall diameter of 200 micrometers and a cladding thickness of 10 micrometers.

The coated fibre was tested using a Photon Kinetics spectrophotometer and an attenuation figure of 4.8 dB/Km at 812 nm was recorded. Commercially available optical fibres in accordance with U.S. Pat. No. 4,511,209 were tested under identical conditions and recorded an attenuation figure of 6.2 dB/Km.

EXAMPLES 2 TO 9

Comparison with fibres of U.S. Pat. No. 4,511,209

The formulations reported in Table 1 were prepared.

TABLE 1

| Example | Mono-acrylate A | Mono-acrylate B | TMPTMA | IG651 | thiol silane | acrylic acid | acrylate silane |
|---|---|---|---|---|---|---|---|
| 2 | 944 | — | 44 | 54 | — | — | — |
| 3 | 890 | — | 44 | 54 | 60 | — | — |
| 4 | 888 | — | 44 | 56 | — | 58 | — |
| 5 | 910 | — | 44 | 56 | — | — | 56 |
| 6 | — | 935 | 58 | 41 | — | — | — |
| 7 | — | 874 | 56 | 41 | — | — | 43 |
| 8 | — | 873 | 58 | 41 | — | 51 | — |
| 9 | — | 880 | 56 | 41 | 41 | — | — |

(parts by weight)

The refractive index of the uncured formulations were measured. The adhesion of the cured formulations to glass was measured by a drag test.

The drag test consisted of coating the formulation to be tested on to a large glass slide. Lines were scored diagonally across the coating and a stylus to which a weight was attached was applied to the coating. The stylus was pulled across the coating. The weight applied to the stylus when a half of the lines are stripped away was recorded, in grams, as a measure of adhesion.

The refractive indices of the uncured, uncross-linked formulation at sodium D line wavelength and adhesion values are reported in the following Table 2.

TABLE 2

| Example | Adhesion | Refractive Index |
|---|---|---|
| 2 | 240 | 1.393 |
| 3 | <160 | 1.397 |
| 4 | >800 | 1.397 |
| 5 | 720 | 1.396 |
| 6 | 240 | |
| 7 | 400 | |
| 8 | 800 | |
| 9 | 160 | |

Examples 2 to 5 show the refractive index of the 3 component system was lower than the comparison formulation. Further that the glass adhesion of the 3 component system and adhesion enhanced systems was greater than that of the thiol silane containing formulation.

Coating using mono-acrylate B (Examples 6 to 9) were subjectively much more brittle than those using monoacrylate A.

EXAMPLES 10 TO 13

Comparison of the effect of fluorinated acrylate on adhesion

The formulations reported in Table 3 were prepared and refractive index and adhesion measurements were conducted as in Example 2.

TABLE 3

| Example | Mono-acrylate B | Mono-acrylate A | TMPTMA | IG651 | Adhesion | Refractive Index |
|---|---|---|---|---|---|---|
| 10 | 928 | — | 57 | 40 | 240 | 1.356 |
| 11 | — | 927 | 54 | 44 | 640 | 1.392 |
| 12 | 922 | — | 49 | 41 | <160 | not measured |
| 13 | — | 946 | 51 | 44 | 720 | not measured |

These results indicate that the fluoro-octyl sulphonamido acrylate monomers exhibit advantageous adhesion properties.

EXAMPLES 14 TO 16

Comparison of the effect of photoinitiator choice on adhesion

The formulations reported in Table 4 were used to coat glass slides. The adhesion properties of the formulations were measured as in Example 2.

TABLE 4

| Example | Mono-acrylate A | TMPTMA | acrylic silane | IG651 | IG500 | IG184 | Adhesion |
|---|---|---|---|---|---|---|---|
| 14 | 734 | 116 | 103 | 115 | — | — | 1040 |
| 15 | 705 | 103 | 108 | — | 109 | — | 720 |
| 16 | 701 | 126 | 114 | — | — | 100 | 800 |

All of these commercial photoinitiators effected acceptable levels of cure.

EXAMPLES 18 TO 23

Comparison of the effect of cross-linking agent selection on adhesion

The formulation reported in Table 5 were used to coat glass slides. The adhesion of the formulations was measured as in Example 2.

TABLE 5

| Example | Mono-acrylate A | IG651 | acrylate silane | TMPTMA | HHA | HDDA | Adhesion |
|---|---|---|---|---|---|---|---|
| 18 | 704 | 60 | 101 | 101 | — | — | 1040 |
| 19 | 696 | 61 | 103 | 50 | — | — | 1200 |
| 20 | 715 | 60 | 105 | — | 114 | — | (a) |
| 21 | 722 | 62 | 101 | — | 62 | — | 1200 |
| 22 | 696 | 63 | 108 | — | — | 104 | 800 |
| 23 | 702 | 61 | 100 | — | — | 51 | 720 |

(a) Very poor quality coatings led to inconsistent results

EXAMPLE 24

Effect of acrylic silane concentration on adhesion

To a formulation comprising Mono-acrylate A, IG651 and TMPTMA in the weight ratio 92:4:4 was added the following proportion of acrylate silane. The adhesion to glass was measured as in Example 2.

| weight % acrylate silane | Adhesion |
|---|---|
| 0 | 240 |
| 1 | 200 |
| 2.4 | 640 |
| 5 | 480 |
| 6 | 640 |
| 7.5 | 640 |
| 11 | 800 |
| 14 | 1040 |
| 19 | 800 |
| 22.5 | 1040 |
| 30 | >>1040 |

It can be clearly seen that any amount of the acrylate silane over 1% was beneficial to core cladding adhesion.

EXAMPLES 25 TO 38

Comparison with fibres of U.S. Pat. No. 4,511,209

Optical fibres were prepared as in Example 1 using the following cladding compositions:

| Example | Mono-acrylate A | IG651 | TMPTMA | acrylic acid | acrylate silane | thiol synergist | Attenuation dB/Km |
|---|---|---|---|---|---|---|---|
| 25 | 88 | 4 | 4 | — | 4 | — | 22 |
| 26 | 88 | 4 | 4 | 4 | — | — | 11.9 |
| 27 | 88 | 4 | 4 | — | — | 4 | 114 |
| 28(1) | 72.1 | 0.9 | 23.3 | — | — | 3.7 | |
| 28 | | | | | | | 48.4 |

(1)Table III, Example 14 of U.S. Pat. No. 4511209 Comparitive Attenuation at 820 nm The presence of the thiol synergist of the prior art does not lead to lower attenuation as in the cladding compositions of the invention.

Comparison of adhesion by lap shear test 0.5 inch (12.8 mm) overlap.

| Example | Immediately after cure | After 24 hrs | % Change |
|---|---|---|---|
| 25 | 100.3 | 108.4 | 8.0 |
| 26 | 123.7 | 178.2 | 44.0 |
| 28 | 66.6 | 71.1 | 6.7 |

Adhesion of cladding to silica of Examples 25 and 26 containing acrylic acid or acrylate silane is considerably improved over the cladding of Example 28 containing thiol synergist. The improvement is particularly pronounced upon ageing.

EXAMPLE 29

Addition of thermal stabilizer

Optical fibres were prepared as in Example 1 using a cladding composition of the following formulation:

| | % by weight |
|---|---|
| mono-acrylate A | 88.5 |
| TMPTA | 5 |
| acrylate silane | 2 |
| IG651 | 4 |
| Ultranox 226 | 0.5 |

After thermal cycling at +125° C. the fibre exhibited a permanent loss damage of 7 dB/Km compared to 10 to 14 dB/Km of fibres having the same cladding formulation without Ultranox 226 thermal stabilizer.

EXAMPLE 30

Combination of two thermal stabilizers

An optical fibre was prepared as in Example 1 using the following cladding formulation.

| | % by weight |
|---|---|
| mono-acrylate A | 82.25 |
| TMPTA | 10 |
| acrylate silane | 5 |
| Darocur 1116 | 2 |
| Cyanox LTDP | 0.5 |
| Irganox 1076 | 0.25 |

After curing the clad fibre was extrusion coated with Tefzel 210 in a conventional manner. The permanent loss damage of the resulting buffered optical fibre was 1.1 Km/dB after being annealed at +125° C. for four hours.

EXAMPLE 31

A cladding composition was prepared by mixing the following components:

| | |
|---|---|
| 1,1-dihydroperfluorocyclohexane carbinol acrylate | 88 parts by weight |
| 2-ethyl-2-(hyroxymethyl)-1,3-propanediol tri-acrylate | 5 parts by weight |
| 3-(trimethoxysilyl)propyl methacrylate | 5 parts by weight |
| Darocur 1173 | 2 parts by weight |

Coated fibres were prepared and evaluated using the procedure according to Example 1. An attenuation figure of 5.73 dB/Km at 820 nm was recorded. After curing the cladded fibre was extrusion coated with Tefzel 210 in a conventional manner to provide a buffered optical fibre with an attenuation loss of 6.23 dB/Km at 820 nm. The thermal stability of the Tefzel buffered fibre was evaluated after maintaining it as 125° C. for four hours and was recorded as 10.58 dB/Km.

The 1,1-dihydroperfluorocyclohexane carbinol acrylate used in this Example was prepared according to the procedure disclosed by D. W. Codding et al., "Journal of Polymer Science", 15, 518 (1955) except that the charge was 210 g trifluoroacetic anhydride, 79.8 g acrylic acid, 250 g perfluorocyclohexylmethylol, and 0.1 g phenathiazine as inhibitor; the reaction mixture was stirred for 2 hours after the reaction had subsided, and the product was purified by vacuum distillation.

A comparison was made of the Tefzel coated cladded fibre prepared in this Example with a commercially available hard clad silica fibre sold by Ensign-Bickford (Simsbury, Conn.). Both fibres were maintained at 125° C. for four hours. The instant fibre was colorless and transparent and showed no increase in attenuation at 600 nm whereas the Ensign-Bickford fibre yellowed and showed an increase in attenuation of 120 dB/Km at 600 nm. "Transparent" means that the cladded fibre when viewed under an optical microscope (e.g., at 100×), have the property of transmitting rays of visible light so that bodies beneath the fibre, for example, such as bodies having essentially the same nature as the fibre, can be clearly seen through the fibre.

Improved properties of the cladded fibre can be realized by including antioxidant/thermal stabilizer in the formulation as has been shown in Example 30.

What we claim is:

1. An optical fibre comprising a core coated with a cladding composition having a lower refractive index than the core, said cladding composition comprising one or more fluorinated mono-acrylates selected from the group consisting of (a) mono-acrylates comprising fluorinated cycloaliphatic functionality, and (b) compounds of the formula

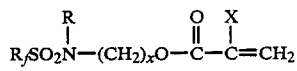

wherein
X is a member selected from the group consisting of H and an alkyl group of 1 to 5 carbon atoms,
R represents an alkyl group of 1 to 5 carbon atoms,
$R_f$ represents a fluoroaliphatic radical in which the higher of a minimum of three C—F bonds are present or 25% of the C—H bonds have been replaced by C—F bonds, and
x is 1 or 2,
a polyfunctional cross-linking acrylate being difunctional or higher, and a photoinitiator, said cladding composition comprising less than 0.3% by weight of a mono- or polyfunctional thiol and being cured or cross-linked.

2. An optical fibre according to claim 1 wherein said cladding composition comprises less than 0.1% by weight of a mono- or polyfunctional thiol.

3. An optical fibre according to claim 1 wherein said cladding composition is free from mono- or polyfunctional thiol.

4. An optical fibre according to claim 1 wherein said fluorinated mono-acrylate comprises a fluoroaliphatic radical or a fluorinated cycloaliphatic radical in which radicals the higher of a minimum of three C—F bonds are present or 25% of the C—H bonds have been replaced by C—F bonds.

5. An optical fibre according to claim 4 wherein said fluoroaliphatic radical is a perfluoroalkyl group of 2 to 12 carbon atoms or a perfluorocycloalkyl group of 5 or 6 carbon atoms.

6. A optical fibre according to claim 1 wherein said fluorinated mono-acrylate is a member selected from the group consisting of compounds of the general formulae:

$$Y-C_nZ_q-(CH_2)_m-O-\overset{O}{\underset{\|}{C}}-\overset{X}{\underset{|}{C}}=CH_2$$

and

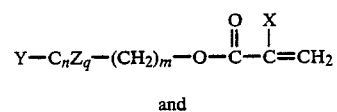

wherein:
Y and Z are independently members selected from the group consisting of H, F and Cl;
X is a member selected from the group consisting of H and an alkyl group of 1 to 5 carbon atoms,
n is an integer from 2 to 12,
q is an integer from 4 to 24
m is 0, 1 or 2,
with the proviso that for Z not more than one atom of H or Cl is present for every two carbon atoms in the group $C_nZ_q$,
R represents an alkyl group of 1 to 5 carbon atoms,
$R_f$ represents a fluoroaliphatic radical in which the higher of a minimum of three C—F bonds are present or 25% of the C—H bonds have been replaced by C—F bonds, and
x is 1 or 2.

7. An optical fibre according to claim 6 wherein said fluorinated mono-acrylate is a member selected from the group consisting of 1,1-dihydroperfluorocyclohexane carbinol acrylate, 1,1-dihydroperfluorocyclohexane carbinol methacrylate, 1,1-dihydroperfluorocyclopentane carbinol acrylate, 1,1-dihydroperfluorocyclopentane carbinol methacrylate, 2-(N-ethyl perfluoro octane sulphonamido)ethyl acrylate, 2-(N-ethyl perfluoro octane sulphonamido)ethyl methacrylate, 2-(N-butyl perfluoro octane sulphonamido)ethyl acrylate and mixtures thereof.

8. An optical fibre according to claim 1 wherein said polyfunctional cross-linking acrylate is trifunctional or higher.

9. An optical fibre according to claim 1 wherein said polyfunctional cross-linking acrylate is a member selected from the group consisting of compounds of the general formulae:

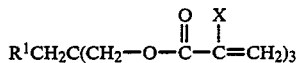

and

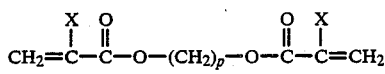

in which:
X is a member selected from the group consisting of H and an alkyl group of 1 to 5 carbon atoms,
$R^1$ is a member selected from the group consisting of an alkyl group of 1 to 5 carbon atoms and —O.-COC(X)CH$_2$, and
p is an integer from 3 to 8.

10. An optical fibre according to claim 1 wherein said polyfunctional cross-linking acrylate is a member selected from the group consisting of trimethylol propane tri(meth)acrylate, 1,4 butanediol di(meth)acrylate, 1,3 butanediol di(meth)acrylate, 1,6 hexanediol di(meth)acrylate, Pentacrythritol tetra(meth)acrylate, pentacrythritol tri(meth)acrylate, dipentacrythritol penta(meth)acrylate, and hydantoin hexa acrylate and mixtures thereof.

11. An optical fibre according to claim 1 wherein said photoinitiator is a substituted acetophenone.

12. An optical fibre according to claim 1 wherein said cladding composition comprises:

| | |
|---|---|
| fluorinated mono-acrylate | 50 to 95% by weight |
| polyfunctional cross-linking acrylate | 2 to 35% by weight |
| photoinitiator | 0.5 to 20% by weight. |

13. An optical fibre according to claim 12 wherein said cladding composition comprises:

| | |
|---|---|
| fluorinated mono-acrylate | 75 to 95% by weight |
| polyfunctional cross-linking acrylate | 2 to 10% by weight |
| photoinitiator | 0.5 to 10% by weight. |

14. An optical fibre according to claim 1 wherein said cladding composition additionally comprises a vinyl-substituted adhesion enhancer different from the fluorinated mono-acrylate and the cross-linkable acrylate.

15. An optical fibre according to claim 14 wherein said vinyl-substituted adhesion enhancer is a (meth)acrylic silane.

16. An optical fibre according to claim 14 wherein said vinyl-substituted adhesion enhancer is present in an amount in the range from 1 to 50% by weight of the total cladding composition.

17. An optical fibre according to claim 16 wherein said adhesion enhancer is present in an amount in the range from 2 to 25% by weight of the total cladding composition.

18. An optical fibre according to claim 1 wherein said cladding composition additionally comprises a thermal stabilizer/antioxidant.

19. An optical fibre according to claim 18 wherein said thermal stabilizer/antioxidant is present in an amount in the range from 0.001 to 5% by weight of the total cladding composition.

20. An optical fibre according to claim 19 wherein said thermal stabilizer/antioxidant is present in an amount in the range from 0.01 to 1% by weight of the total cladding composition.

21. An optical fibre according to claim 19 wherein said thermal stabilizer/antioxidant is a member selected from the group consisting of hindered phenols and thioesters.

22. An optical fibre according to claim 21 wherein said thermal stabilizer/antioxidant is a member selected from the group consisting of 2,6-di-tert-butyl-4-methyl phenyl, octadecyl-3,5-di-tert-butyl-4-hydroxyhydrocinnamate, 2,6-di-tert-butyl-4-sec-butyl phenol, dilauryl thiodipropionate and combinations thereof.

23. An optical fibre according to claim 1 wherein the refractive index of said cladding composition is at least 0.03 units less than that of the core.

24. An optical fibre according to claim 23 wherein the refractive index of said cladding composition is at least 0.05 units less than that of the core.

25. An optical fibre according to claim 23 wherein said core consists of fused silica.

26. An optical fibre according to claim 1 additionally comprising a protective layer over said cladding composition.

27. An optical fibre according to claim 26 wherein said protective coating comprises a fluoropolymer.

28. A cladding composition for optical fibres comprising:
from 50 to 95% by weight of one or more fluorinated acrylates selected from the group consisting of (a) mono-acrylates comprising fluorinated cycloaliphatic functionality, and (b) compounds having the formula

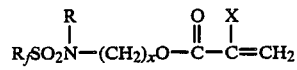

wherein
X is a member selected from the group consisting of H and an alkyl group of 1 to 5 carbon atoms,
R represents an alkyl group of 1 to 5 carbon atoms,
$R_f$ represents a fluoroaliphatic radical in which the higher of a minimum of three C—F bonds are present or 25% of the C—H bonds have been replaced by C—F bonds, and
x is 1 or 2,
from 2 to 35% by weight of a polyfunctional cross-linking acrylate being difunctional or higher and,
from 0.5 to 20% by weight of a photoinitiator,
said composition comprising less than 0.3% by weight of a mono- or polyfunctional thiol.

29. A cladding composition according to claim 28 which is free from mono- or polyfunctional thiol.

30. A cladding composition according to claim 28 wherein said fluorinated acrylate comprises a fluoroaliphatic radical in which the higher of a minimum of three C—F bonds are present or 25% of the C—H bonds have been replaced by C—F bonds.

31. A cladding composition according to claim 28 wherein said fluorinated acrylate is 2-(N-ethyl perfluoro-octane sulphonamido)-ethyl acrylate.

32. A cladding composition according to claim 28 wherein said cross-linking acrylate is a member selected from the group consisting of trimethylol propane triacrylate and trimethylol propane trimethacrylate.

33. A cladding composition according to claim 28 wherein said photoinitiator is a substituted acetophonone.

34. A cladding composition according to claim 28 comprising:

| | |
|---|---|
| fluorinated acrylate polyfunctional | 75 to 95% by weight |
| cross-linking acrylate | 2 to 10% by weight |
| photoinitiator | 2 to 10% by weight. |

35. A cladding composition according to claim 28 additionally comprising from 1 to 50% by weight of the total composition of a vinyl-substituted adhesion enhancer.

36. A cladding composition according to claim 35 wherein said adhesion enhancer is a (meth)acrylic silane.

37. A cladding composition according to claim 28 additionally comprising a thermal stabilizer/antioxidant in an amount in the range from 0.001 to 5% by weight of the total cladding composition.

38. A cladding composition according to claim 37 wherein said thermal stabilizers/antioxidant is a member selected from the group consisting of 2,6-di-tert-butyl-4-methyl phenol, octadecyl-3,5-di-tert-butyl-4hydroxyhydrocinnamate, 2,6-di-tert-butyl-4-sec-butyl phenol, dilauryl thiodipropionate and combinations thereof.

39. A cladding composition according to claim 28 wherein said fluorinated mono-acrylate is a member selected from the group consisting of 1,1-dihydroperfluorocyclohexane carbinol acrylate, 1,1-dihydroperfluorocyclohexane carbinol methacylate, 1,1-dihydroperfluorocyclopentane carbinol acrylate, 1,1-dihydroperfluorocyclopentane carbinol methacrylate, 2-(N-ethyl perfluoro octane sulphonamido)-ethyl acrylate, 2-(N-ethyl perfluoro octane sulphonamido)-ethyl methacrylate, 2-(N-butyl perfluoro octane sulphonamido)ethyl acrylate, and mixtures thereof.

40. The optical fibre according to claim 1 wherein said fluorinated mono-acrylate is 1,1-dihydroperfluorocyclohexane carbinol acrylate.

41. The cladding composition according to claim 28 wherein said fluorinated mono-acrylate is 1,1-dihydroperfluorocyclohexane carbinol acrylate.

* * * * *